March 25, 1969    W. T. RYAN, JR    3,435,198
PHOTOFLASH CUBE
Filed Nov. 16, 1966
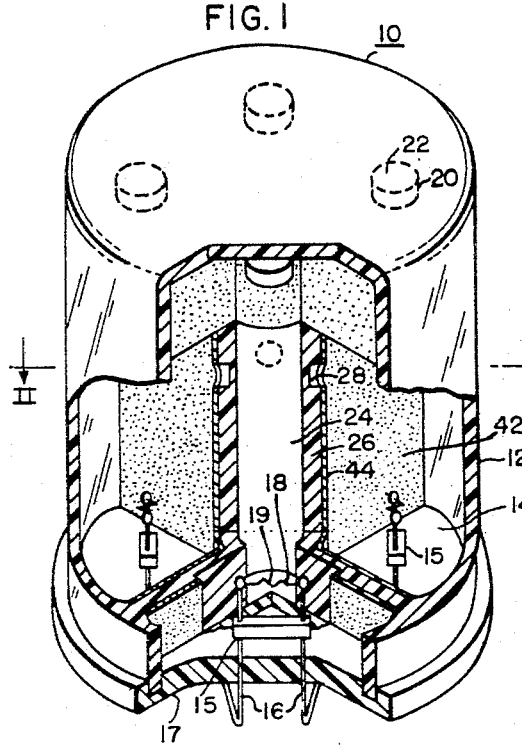
FIG. 1
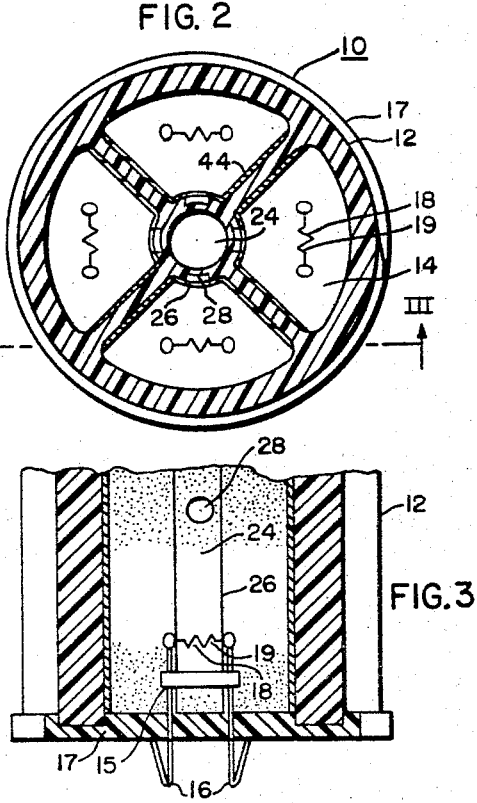
FIG. 2
FIG. 3
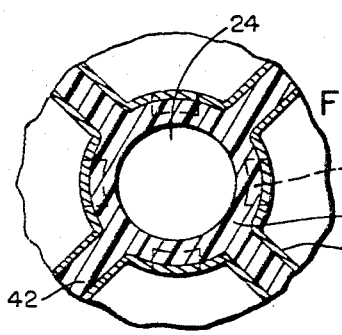
FIG. 4
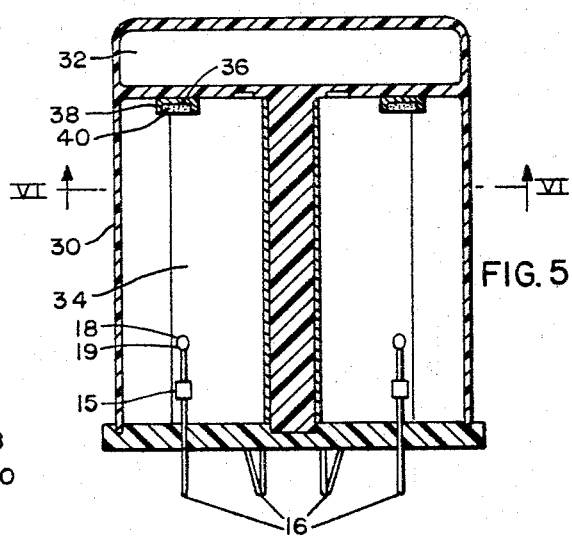
FIG. 5
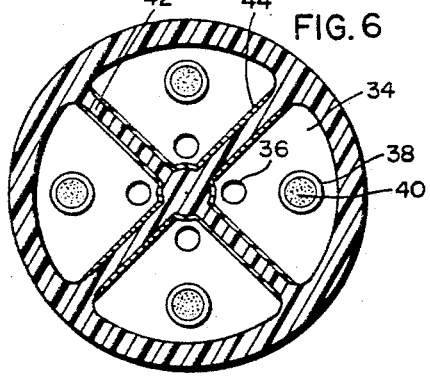
FIG. 6
INVENTOR
William T. Ryan, Jr.
BY
W. D. Palmer
ATTORNEY

United States Patent Office 3,435,198
Patented Mar. 25, 1969

3,435,198
PHOTOFLASH CUBE
William T. Ryan, Jr., Bloomfield, N.J., assignor to Westinghouse Electric Corporation, Pittsburgh, Pa., a corporation of Pennsylvania
Filed Nov. 16, 1966, Ser. No. 594,893
Int. Cl. G03b 15/05
U.S. Cl. 240—1.3          5 Claims This invention generally relates to photoflash lamps, and more particularly, to photoflash lamps which have a plastic envelope and are grouped together to form an assemblage.

Multi-lamp photoflash units for use with photographic cameras are known and eliminate individual loading and disposal of the lamps before and after each exposure. The multi-lamp units which are now marketed commercially incorporate the glass envelope type lamp which contains an oxygen atmosphere at relatively high pressure. The individual glass envelope lamps are relatively expensive to manufacture.

A sealed, organic-plastic-envelope photoflash lamp which is quite inexpensive to manufacture is disclosed in Baird Patent No. 3,220,224, dated Nov. 30, 1965. Such lamps are sealed to prevent the escape of the generated gases into the atmosphere with its resultant unpleasant noise and odor. It has been the practice to provide a relatively thick plastic envelope to eliminate the danger of any envelope rupture.

It is an object of this invention to group a plurality of organic-plastic-envelope photoflash lamps within an assemblage for use with a photographic camera and wherein any tendency for envelope rupture is eliminated.

It is another object to provide a safety means to insure that the outer envelope of an organic plastic envelope lamp will not rupture under the pressures generated when the lamp is fired.

It is a further object to provide an assemblage of organic-plastic-envelope type photoflash lamps which includes a safety means to insure that the outer envelopes of the individual lamps will not rupture when they are flashed.

The foregoing objects, and other objects which will become apparent as the description proceeds, are achieved by providing a pressure relief chamber within a sealed assemblage. The assemblage comprises a plurality of organic-plastic-envelope photoflash lamps. The pressure relief chamber is separated from the individual photoflash lamps by a common wall, a portion of which is thinner by a predetermined amount than the remainder of the common wall. This relatively thin portion of the common wall ruptures when the individual lamp is flashed due to the generated pressure and thereby provides a throttling aperture to relieve the pressures generated by the flashed lamp.

For a better understanding of the invention, reference should be made to the accompanying drawings, wherein:

FIGURE 1 is an elevational isometric, cut away and sectioned in part to reveal internal structure;

FIG. 2 is a view taken in the line II—II in FIG. 1 in the direction of the arrows;

FIG. 3 is an enlarged fragmentary sectional elevation taken along line III—III in FIG. 2 in the direction of the arrows;

FIG. 4 is an enlarged, fragmentary view of the central portion of the embodiment shown in FIG. 2, which shows more clearly the pressure relief chamber and the wall structure between the relief chamber and the individual lamps;

FIG. 5 is a sectional elevational view of another embodiment of the invention in which the pressure relief chamber is adjacent the top envelope surface of the individual lamps; and FIG. 6 is a view through lines VI—VI of FIG. 5 taken in the direction of the arrows.

Specifically referring to the drawings, the assemblage 10 as shown in FIGS. 1 and 2 is defined by a light-transmitting, organic plastic outer envelope 12, which like all the other lamp walls is formed of a material such as cellulose acetate propionate and is approximately forty mils thick. This outer envelope 12 also serves as one wall portion for each of the individual photoflash lamps 14. The individual lamps 14 are generally described in Patent No. 3,220,224 to Baird. Such lamps have individual ignition means which comprise two metallic, electrical lead-ins 16, which are brought through the base 17 of each individual lamp 14 to allow individual flashing, which lead-ins 16 are maintained separated by a spacer 15, and which lead-ins 16 support a filament 18 formed of conventional tungsten which is coated with a conventional primer material 19 such as a mixture of finely divided zirconium and potassium perchlorate. Physically separated from the filament 18 is a cap 20 which is formed of cellulose acetate propionate and contains a flashing material 22 which is a mixture of finely divided zirconium and finely divided barium nitrate, strontium nitrate, or potassium chlorate, or mixtures thereof, and is ignited upon the activation of the filament 18 and the primer material 19 deposited thereon. The basic lamp components are described in detail in the aforementioned Baird patent.

In the embodiment depicted in FIGS. 1–4 a cylindrical outer envelope encloses a centrally disposed pressure relief chamber 24 occupying a cylindrical volume about the longitudinal axis of the cylindrical assemblage. The pressure relief chamber 24 is defined by a common wall 26 separating this chamber 24 from each individual photoflash lamp 14. A small portion 28 of said common wall is thinner by a predetermined amount than the rest of said common wall 26 and acts as a throttling aperture upon rupture.

The area and thickness of this thin wall portion 28 of the common wall 26 is a function of various photoflash lamp 14 design parameters which are flexible. However, the area and thickness of an aperture is limited by the following considerations. The area of an aperture is determined with respect to the individual lamp 14 volume and the pressure relief chamber 24 volume to allow it to act as a throttling aperture. The wall area, which upon rupture forms the throttling aperture 28, is thin enough to rupture when the individual lamp 14 with which it is associated is flashed, yet it is thick enough to withstand any pressure gradient in the relief chamber 24 as any other lamp of the assemblage is flashed.

As an example, the envelope 12 is formed of forty mils cellulose acetate propionate and encloses an individual lamp 14 having a volume of approximately 7 cc. The pressure relief chamber 24 occupies the central portion of the assemblage and has a volume approximately one fifth of the volume of an individual lamp 14. The thin walled portion 28 of the common wall 26, which upon rupture acts as a throttling aperture, is approximately 15 mils thick, and has a diameter of approximately 0.125 inch.

The lamp assemblage embodiment 30, which is shown in FIGS. 5 and 6, has the pressure relief chamber 32 adjacent to the top end envelope surface 33 of the elongated individual lamp 34. In FIGS. 5 and 6 the location of the throttling aperture 36 is shown in detail, as is its location with respect to the cap 38 holding the flashing material 40. In either embodiment of the assemblage, the interior wall surfaces 42 exclusive of the face forming the outer envelope 12 of the individual photoflash lamps 14 desirably are coated wth a light reflective material 44.

It will be recognized that the objects of this invention have been achieved by the provision of a number of photoflash lamps which have been grouped into an assemblage, and in so doing an improved design of the individual photoflash lamps has been effected to protect against any tendency for envelope rupture. The fact that a plurality of lamps have been packaged together for commercial purposes has allowed incorporation of a common pressure relief chamber for the safer operation of the individual lamps.

While preferred embodiments of the invention have been illustrated and described hereinbefore, it is to be understood that the invention is not limited thereto or thereby.

I claim as my invention:

1. In combination with a plurality of photoflash lamps joined to form an assemblage, each of said photoflash lamps comprising a sealed light-transmitting organic plastic envelope of predetermined thickness and enclosing a charge of flash-producing material, and ignition means associated with each of said lamps to permit said lamps to be flashed individually, the improvement which comprises:

(a) at least one sealed pressure relief chamber forming a part of said assemblage, and each of said individual lamps having a common wall with said pressure relief chamber;

(b) a relatively small portion of each of said common walls between each of said individual lamps and said pressure relief chamber having a thickness which is less by a predetermined amount than the thickness of the remaining portion of each of said common walls as well as the thickness of all other portions of the individual lamp envelopes;

(c) a location for controlled rupture provided by each said small common wall portion of reduced thickness, and upon activation of said ignition means to flash any one of said lamps, said portion of reduced thickness in said common wall of said lamp being flashed rupturing under the generated pressure to form a gas-throttling aperture from the envelope of the lamp being flashed into said pressure relief chamber;

(d) the thickness of said portion of reduced thickness in all of said common walls of yet-unflashed lamps being sufficient to withstand rupture under the pressure encountered in said pressure relief chamber during flashing of any of said individual lamps.

2. The combination as specified in claim 1, wherein said pressure relief chamber is centrally disposed with respect to each of said individual photoflash lamps.

3. The combination as specified in claim 1, wherein said photoflash lamps are elongated, and said pressure relief chamber is positioned adjacent one end of each of said elongated photoflash lamps.

4. The combination as specified in claim 1, wherein each of said lamps has a face portion through which light is emitted on flashing, and an integral reflector is associated with each of said lamps for directing the generated light toward said lamp face portion.

5. The combination as specified in claim 1, wherein said pressure relief chamber occupies the volume about the longitudinal axis of a cylindrical assemblage, and and lamps are arranged about the central cylinder.

References Cited

UNITED STATES PATENTS

| | | | |
|---|---|---|---|
| 2,865,186 | 12/1958 | Anderson et al. | 431—93 |
| 3,220,224 | 11/1965 | Baird | 431—94 |
| 3,309,513 | 3/1967 | Aymar | 240—1.3 |
| 3,319,058 | 5/1967 | Toomey et al. | 431—93 X |
| 3,350,551 | 10/1967 | Whitehead | 240—1.3 |
| 3,358,476 | 12/1967 | Buzalski | 240—1.3 X |

NORTON ANSHER, *Primary Examiner.*

C. E. SMITH, *Assistant Examiner.*

U.S. Cl. X.R.

431—95